United States Patent
Iftime et al.

(10) Patent No.: US 8,801,954 B2
(45) Date of Patent: *Aug. 12, 2014

(54) CURABLE INKS COMPRISING COATED MAGNETIC NANOPARTICLES

(75) Inventors: Gabriel Iftime, Mississauga (CA); Naveen Chopra, Oakville (CA); Barkev Keoshkerian, Thornhill (CA); Peter G. Odell, Mississauga (CA); Marcel P. Breton, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 520 days.

This patent is subject to a terminal disclaimer.

(21) Appl. No.: 13/050,423

(22) Filed: Mar. 17, 2011

(65) Prior Publication Data
US 2012/0235079 A1    Sep. 20, 2012

(51) Int. Cl.
| | |
|---|---|
| C04B 35/04 | (2006.01) |
| C04B 35/64 | (2006.01) |
| C09D 11/00 | (2014.01) |
| H01F 1/00 | (2006.01) |

(52) U.S. Cl.
USPC ............. 252/62.54; 252/62.55; 106/31.32; 106/31.64

(58) Field of Classification Search
USPC ............. 252/62.54, 62.55, 62.52; 106/31.32, 106/31.6, 31.64, 31.75, 31.92; 523/10, 160, 523/161; 522/178, 182; 524/178, 182
See application file for complete search history.

(56) References Cited

U.S. PATENT DOCUMENTS

| | | |
|---|---|---|
| 4,463,034 A | 7/1984 | Tokunaga et al. |
| 5,334,471 A * | 8/1994 | Sacripante et al. ........ 430/106.2 |
| 5,866,637 A | 2/1999 | Lorenz |
| 6,767,396 B2 | 7/2004 | McElligott et al. |
| 7,153,349 B2 | 12/2006 | Carlini et al. |
| 7,259,275 B2 | 8/2007 | Belelie et al. |
| 7,270,408 B2 | 9/2007 | Odell et al. |
| 7,271,284 B2 | 9/2007 | Toma et al. |
| 7,276,614 B2 | 10/2007 | Toma et al. |
| 7,279,506 B2 | 10/2007 | Sisler et al. |
| 7,279,587 B2 | 10/2007 | Odell et al. |
| 7,293,868 B2 | 11/2007 | Odell et al. |
| 7,317,122 B2 | 1/2008 | Carlini et al. |
| 7,323,498 B2 | 1/2008 | Belelie et al. |
| 7,384,463 B2 | 6/2008 | Norsten et al. |
| 7,407,572 B2 | 8/2008 | Steffens et al. |
| 7,449,515 B2 | 11/2008 | Belelie et al. |
| 7,459,014 B2 | 12/2008 | Breton et al. |
| 7,531,582 B2 | 5/2009 | Toma et al. |
| 7,538,145 B2 | 5/2009 | Belelie et al. |
| 7,541,406 B2 | 6/2009 | Banning et al. |

(Continued)

OTHER PUBLICATIONS

U.S. Appl. No. 12/765,148, filed Apr. 22, 2010, entitled "Amide Gellant Compounds with Aromatic End Groups," for Chopra et al.

*Primary Examiner* — Melvin C Mayes
*Assistant Examiner* — Lynne Edmondson
(74) *Attorney, Agent, or Firm* — Pillsbury Winthrop Shaw Pittman LLP (57) ABSTRACT

There is provided novel curable ink compositions comprising coated magnetic metal nanoparticles. In particular, there is provided ultraviolet (UV) curable gel inks comprising at least the coated magnetic metal nanoparticles, one curable monomer, a radiation activated initiator that initiates polymerization of curable components of the ink, a gellant. The inks may also include optional colorants and one or more optional additives. These curable gel UV ink compositions can be used for ink jet printing in a variety of applications.

20 Claims, 1 Drawing Sheet

(56) References Cited

U.S. PATENT DOCUMENTS

| | | |
|---|---|---|
| 7,553,011 B2 | 6/2009 | Odell et al. |
| 7,556,844 B2 | 7/2009 | Iftime et al. |
| 7,559,639 B2 | 7/2009 | Belelie et al. |
| 7,563,489 B2 | 7/2009 | Carlini et al. |
| 7,578,587 B2 | 8/2009 | Belelie et al. |
| 7,625,956 B2 | 12/2009 | Odell et al. |
| 7,632,546 B2 | 12/2009 | Odell et al. |
| 7,674,842 B2 | 3/2010 | Belelie et al. |
| 7,681,966 B2 | 3/2010 | Parker et al. |
| 7,683,102 B2 | 3/2010 | Odell et al. |
| 7,690,782 B2 | 4/2010 | Odell |
| 7,691,920 B2 | 4/2010 | Belelie et al. |
| 7,699,922 B2 | 4/2010 | Breton et al. |
| 7,714,040 B2 | 5/2010 | Toma et al. |
| 7,754,779 B2 | 7/2010 | Odell et al. |
| 7,812,064 B2 | 10/2010 | Odell et al. |
| 7,820,731 B2 | 10/2010 | Odell et al. |
| 8,303,838 B2 * | 11/2012 | Iftime et al. ............... 252/62.54 |
| 8,313,666 B2 * | 11/2012 | Iftime et al. ............... 252/62.54 |
| 2004/0000254 A1 * | 1/2004 | McElligott et al. ........ 106/31.65 |
| 2007/0249747 A1 | 10/2007 | Tsuji et al. |
| 2009/0321676 A1 * | 12/2009 | Breton et al. ............... 252/62.53 |
| 2010/0015472 A1 | 1/2010 | Bradshaw et al. |
| 2010/0060539 A1 * | 3/2010 | Suetsuna et al. ............... 343/787 |
| 2010/0221510 A1 * | 9/2010 | Odell et al. ................... 428/206 |
| 2010/0304006 A1 | 12/2010 | Delpech et al. |

* cited by examiner

CURABLE INKS COMPRISING COATED MAGNETIC NANOPARTICLES

CROSS REFERENCE TO RELATED APPLICATIONS

Reference is made to commonly owned U.S. Pat. No. 8,303,838 entitled "Curable Inks Comprising Inorganic Oxide-Coated Magnetic Nanoparticles" to Iftime et al.; U.S. Pat. No. 8,579,420 entitled "Solvent-Based Inks Comprising Coated Magnetic Nanoparticles" to Iftime et al.; U.S. Pat. No. 8,409,341 entitled "Solvent-Based Inks Comprising Coated Magnetic Nanoparticles" to Iftime et al.; U.S. Patent application Ser. No. 13/050,403 entitled "Magnetic Curable Inks" to Iftime et al.; U.S. Pat. No. 8,657,431 entitled "Phase Change Magnetic Ink Comprising Carbon Coated Magnetic Nanoparticles And Process For Preparing Same," to Iftime et al.; U.S patent application Ser. No. 13/049,937 (abandoned Mar. 20, 2014) entitled "Solvent Based Magnetic Ink Comprising Carbon Coated Magnetic Nanoparticles And Process For Preparing Same" to Iftime et al.; U.S. patent application Ser. No. 13/049,942 entitled "Phase Change Magnetic Ink Comprising Coated Magnetic Nanoparticles And Process For Preparing Same" to Iftime et al.; U.S. patent application Ser. No. 13/049,945 entitled "Phase Change Magnetic Ink Comprising Inorganic Oxide Coated Magnetic Nanoparticles And Process For Preparing Same" to Iftime et al.; U.S. Pat No 8,709,274 entitled "Curable Inks Comprising Surfactant-Coated Magnetic Nanoparticles" to Iftime et al.; U.S. Pat. No. 8,313,666 entitled "Curable Inks Comprising Polymer-Coated Magnetic Nanoparticles" to Iftime et al.; U.S. Pat. No. 8,646,896 entitled "Phase Change Magnetic Ink Comprising Surfactant Coated Magnetic Nanoparticles and Process for Preparing the Same" to Iftime et al.; and U.S. Pat. No. 8,702,217 entitled "Phase Change Magnetic Ink Comprising Polymer Coated Magnetic Nanoparticles and Process for Preparing the Same" to Iftime et al., all filed electronically on the same day as the present application, the entire disclosures of which are incorporated herein by reference in its entirety.

BACKGROUND

Non-digital inks and printing elements suitable for Magnetic Ink Character Recognition (MICR) printing are generally known. The two most commonly known technologies are ribbon-based thermal printing systems and offset technology. For example, U.S. Pat. No. 4,463,034 discloses heat sensitive magnetic transfer element for printing MICR, comprising a heat resistant foundation and a heat sensitive imaging layer. The imaging layer is made of ferromagnetic substance dispersed in a wax and is transferred on a receiving paper in the form of magnetic image by a thermal printer which uses a ribbon. U.S. Pat. No. 5,866,637 discloses formulations and ribbons which employ wax, binder resin and organic molecule based magnets which are to be employed for use with a thermal printer which employs a ribbon. MICR ink suitable for offset printing using a numbering box are typically thick, highly concentrated pastes consisting for example in about over 60% magnetic metal oxides dispersed in a base containing soy-based varnishes. Such inks are, for example, commercially available at Heath Custom Press (Auburn, Wash.). Digital water-based ink-jet inks composition for MICR applications using a metal oxide based ferromagnetic particles of a particle size of less than 500 microns are disclosed in U.S. Pat. No. 6,767,396. Water-based inks are commercially available from Diversified Nano Corporation (San Diego, Calif.).

The present embodiments are directed to curable inks. Curable inks generally comprise at least one curable monomer, a colorant, and a radiation activated initiator that initiates polymerization of curable components of the ink. In particular, the curable ink is a ultraviolet (UV) curable gel ultraviolet ink. In particular, the curable ink is an UV curable ink. These UV curable gel ink compositions can be used for ink jet printing in a variety of applications. In addition to providing desirable ink qualities, the present embodiments are directed to magnetic inks for use in specific applications. The UV curable gel ink of the present embodiments comprises magnetic nanoparticles that are coated with various materials to prevent the exposure of the nanoparticles to oxygen.

UV curable gel inks are known. They are for example disclosed in, for example, U.S. Pat. Nos. 7,153,349, 7,259,275, 7,270,408, 7,271,284, 7,276,614, 7,279,506, 7,279,587, 7,293,868, 7,317,122, 7,323,498, 7,384,463, 7,449,515, 7,459,014, 7,531,582, 7,538,145, 7,541,406, 7,553,011, 7,556,844, 7,559,639, 7,563,489, 7,578,587, 7,625,956, 7,632,546, 7,674,842, 7,681,966, 7,683,102, 7,690,782, 7,691,920, 7,699,922, 7,714,040, 7,754,779, 7,812,064, and 7,820,731, the disclosures of each of which are totally incorporated herein by reference. UV Curable gel inks can exhibit desirable characteristics such as improved hardness and scratch-resistance and improved adhesion to various substrates. Curable gel inks can also exhibit advantages in that dot spread of the ink can be controlled, the ink does not bleed excessively into the substrate, including porous substrate.

The present embodiments are directed to UV curable magnetic inks which comprise metal nanoparticles. These magnetic inks are required for specific applications such as Magnetic Ink Character Recognition (MICR) for automated check processing and security printing for document authentication. One of the inherent properties of uncoated magnetic metal nanoparticles which precludes their use in the fabrication of commercial inks is their pyrophoric nature; uncoated (bare) magnetic nanoparticles ignite spontaneously when exposed to oxygen in the ambient environment. As such, uncoated magnetic metal nanoparticles are a serious fire hazard. As such, large scale production of the UV curable inks comprising such particles is difficult because air and water need to be completely removed when handling the particles. In addition, the ink preparation process is particularly challenging with magnetic pigments because inorganic magnetic particles are incompatible with organic base components.

Thus, while the disclosed curable ink formulation provides some advantages over the prior formulations, there is still a need to achieve a formulation that not only provides the desirable properties of a curable ink and a curable gel UV ink in particular, but it is also magnetic. Furthermore there is a need to achieve a magnetic curable ink formulation that is easily produced and derived from components that do not require special handling conditions.

SUMMARY

According to embodiments illustrated herein, there is provided novel curable ink compositions comprising coated magnetic metal nanoparticles. A particular embodiment provides curable gel UV ink compositions as well as UV curable compositions.

In particular, the present embodiments provide an ink comprising: a curable ink carrier comprising a monomer, a photoinitiator, an optional curable oligomer, and one or more optional additives; coated magnetic nanoparticles, wherein the coated magnetic nanoparticles are comprised of a magnetic metal core and a protective coating disposed on the magnetic metal core; and an optional colorant.

In further embodiments, there is provided an ink comprising: a curable ink carrier comprising a monomer, a photoinitiator, an optional curable oligomer, and one or more optional additives; coated magnetic nanoparticles, wherein the coated magnetic nanoparticles are comprised of a magnetic metal core and a protective coating disposed on the magnetic metal core; a gellant; and an optional colorant.

In yet other embodiments, there is provided an ink comprising: a curable ink carrier comprising a monomer, a photoinitiator, an optional curable oligomer, and one or more optional additives; coated magnetic nanoparticles, wherein the coated magnetic nanoparticles are comprised of a magnetic metal core and a protective coating disposed on the magnetic metal core; and an optional colorant, wherein the ink is used for Magnetic Ink Character Recognition applications.

BRIEF DESCRIPTION OF THE DRAWINGS

For a better understanding of the present embodiments, reference may be had to the accompanying figures.

DETAILED DESCRIPTION

In the following description, it is understood that other embodiments may be utilized and structural and operational changes may be made without departure from the scope of the present embodiments disclosed herein.

Curable ink technology broadens printing capability and customer base across many markets, and the diversity of printing applications will be facilitated by effective integration of printhead technology, print process and ink materials. As discussed above, while current ink options are successful for printing on various substrates, there is a need for a method to produce magnetic curable inks comprising magnetic metal nanoparticles which reduces the safety risks associated with the nanoparticles.

The present embodiments are directed generally to ultraviolet (UV) curable magnetic inks and in a preferred embodiment to magnetic UV curable gel inks. In particular, the present embodiments provide curable inks that are made with coated magnetic metal nanoparticles dispersed in a UV curable ink base. One of the inherent properties of uncoated magnetic metal nanoparticles which precludes their use in the fabrication of commercial inks is their pyrophoric nature; uncoated (bare) magnetic nanoparticles of a certain size, typically in the order of a few tens of nanometers or less, ignite spontaneously when exposed to oxygen in the ambient environment. For example, bare iron, cobalt and alloys nanoparticles are a serious fire hazard. Thus, the present embodiments provide a safe method for preparation of stable magnetic UV curable inks suitable for applications that require the use of magnetic inks. The present embodiments provide coated magnetic metal nanoparticles which are protected from exposure to water and air. These nanoparticles have a coating of various materials, such as for example, carbon, polymers, inorganic oxides, surfactants, or mixtures thereof, which acts as a barrier to water or air.

Magnetic inks are required for two main applications: (1) Magnetic Ink Character Recognition (MICR) for automated check processing and (2) security printing for document authentication. The resulting curable ink can be used for these applications.

The resulting curable ink can also be applied with piezo type inkjet print heads suitable for both low and high temperature operation. Currently only water-based MICR inkjet ink are commercially available. Water based inks require special care of the printhead to prevent evaporation of the ink or deposition of salts within the channel rendering the jetting ineffective. Furthermore high quality printing with aqueous inks generally requires specially treated image substrates. In addition, there is generally a concern with respect to possible incompatibility when operating both UV curable inks and water-based inks within the same printer. Issues like water evaporation due to the proximity to the organic curable heated ink tanks, rust, high humidity sensitivity of the UV ink are key problems which may prevent implementation of the water-based MICR solution. Thus, the present embodiments further avoid these issues.

The present embodiments provide a UV curable ink made from coated metal magnetic nanoparticles dispersed in a UV curable ink base. The ink base may include one or more resins, one or more colorant, and/or one or more additives, such as, a gellant, dispersant and/or a dispersant/synergist combination. The dispersant may be the same or different when compared with the surfactant present, in some embodiments, on the surface of the particle prior to ink preparation. Although in embodiments where the surface coating comprises surfactants, the dispersant and/or synergist may not be needed. Thus, selection of the dispersant and/or synergist depends on the type of protective coating.

The inks are suitable for use in various applications, including MICR applications. In addition, the printed inks may be used for decoration purposes, even if the resulting inks do not sufficiently exhibit coercivity and remanence suitable for use in MICR applications. They may also be used for security printing applications.

Figure 1:
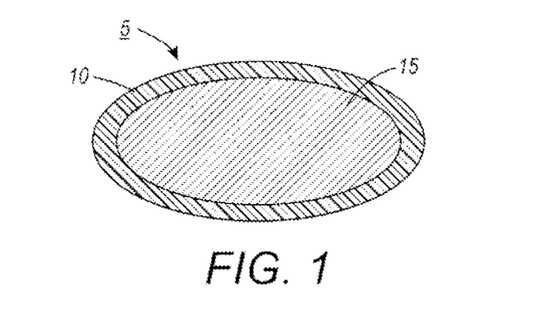
FIG. 1 illustrates a cross-section of a coated magnetic nanoparticle according to the present embodiments.
Figure 2:
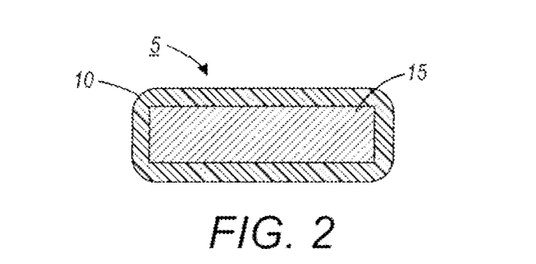
FIG. 2 illustrates a cross-section of a coated magnetic nanoparticle according to an alternative embodiment to FIG. 1.
Figure 3:
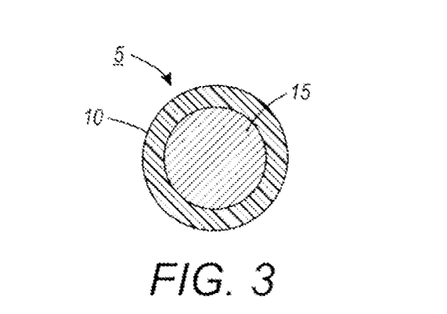
FIG. 3 illustrates a cross-section of a coated magnetic nanoparticle according to an alternative embodiment to FIG. 1 or FIG. 2.

The coated magnetic nanoparticles 5 are made of a core magnetic nanoparticle 15 coated on the surface with a coating material 10 as shown in FIGS. 1-3. The coated magnetic nanoparticles can be produced to have different shapes such as oval (FIG. 1), cubed (FIG. 2), and spherical (FIG. 3). The shapes are not limited to those depicted in the figures. Suitable coating materials may include a variety of materials, including for example, carbon, polymers, inorganic oxides, surfactants and mixtures thereof. Carbon materials may be selected from the group consisting of amorphous carbon, glassy carbon, graphite, carbon nanofoam, diamond, and the like and mixtures thereof. Polymeric materials may be selected from the group consisting of amorphous, crystalline, polymers and oligomers with a low molecular weight (for example, a Mw of from about 500 Daltons to about 5000 Daltons, polymers with a high molecular weight (for example, a Mw of from about 5000 Daltons to about 1,000,000 Daltons), homopolymers, copolymers made of one or more types of monomers, and the like and mixtures thereof. Inorganic oxides may be selected from the group consisting of silica, titanium oxide, iron oxide, zinc oxide, and the like and mixtures thereof. Surfactants may be selected from the group consisting of anionic, cationic, non-ionic, zwitterionic surfactants, and the like and mixtures thereof.

The magnetic ink is made by dispersing the coated nanoparticles in a UV curable ink base. The coating present on the surface of the nanoparticles provides air and moisture stability such that the nanoparticles are safer to handle.

Coating Materials for Magnetic Metal Nanoparticles

Various materials may be used for the nanoparticle coating materials, for example, carbon, polymers, inorganic oxides, surfactants and mixtures thereof. The coating is disposed on the surface of the magnetic metal nanoparticles and may have a layer thickness of from about 0.2 nm to about 100 nm, or from about 0.5 nm to about 50 nm, or from about 1 nm to about 20 nm.

Carbon coated magnetic nanoparticles are commercially available (for example from Nanoshel Corporation (Wilmington, Del.). The carbon coated metal nanoparticles are typically produced by a laser evaporation process. For example, graphite layer coated nickel nanoparticles of diameters comprised between 3 an 10 nm were produced by laser ablation techniques (Q. Ou, T. Tanaka, M. Mesko, A. Ogino, M. Nagatsu, Diamond and Related materials, Vol. 17, Issues 4-5, pages 664-8, 2008). In a different approach, carbon coated iron nanoparticles were prepared by carbonizing polyvinyl alcohol using iron as a catalyst in hydrogen flow (Yu Liang An. et al., Advanced Materials Research, 92, 7, 2010). Alternatively, carbon coated ion nanoparticles were prepared by using an annealing procedure. The procedure induced carbonization of a stabilizing organic material-3-(N,N-Dimethyllaurylammonio)propane sulfonate—which was used to stabilize the pre-formed iron nanoparticles. The process is performed under flow of hydrogen to ensure carbonization process. The carbon shell was found to effectively protect the iron core from oxidation in acidic solutions (Z. Guo, L. L. Henry, E. J. Podlaha, ECS Transactions, 1 (12) 63-69, 2006).

Various polymers are suitable for producing protective coating layers for the magnetic metal cores in nanoparticles. Suitable examples include Poly(methyl methacrylate) (PMMA), polystyrene, polyesters, and the like. Polymers can be homopolymers or copolymers, linear or branched, random and block copolymers.

Coatings and methods for coating particles with polymers layers are described in, for example, Caruso, F., Advanced Materials, 13: 11-22 (2001). Polymer coated nanoparticles can be obtained via synthetic and non synthetic routes: polymerization of the particle surface; adsorption onto the particles; surface modifications via polymerization processes; self-assembled polymer layers; inorganic and composite coatings including precipitation and surface reactions and controlled deposition of preformed inorganic colloids; and use of biomacromolecular layer in specific applications. A number of techniques for the preparation of magnetic nano- and micronized particles are also described in Journal of Separation Science, 30: 1751-1772 (2007). Polystyrene-coated cobalt nanoparticles are described in U.S. Publication No. 2010/0015472 to Bradshaw, which is hereby incorporated by reference. The disclosed process consists of thermal decomposition of dicobalt octacarbonyl in dichlorobenzene as a solvent in the presence of a polystyrene polymer terminated with a phosphine oxide group and an amine terminated polystyrene, at 160° C. under argon. The process provided magnetic cobalt nanoparticles having a polymer coating including a polystyrene shell. Additionally, other polymer shells can be placed on the surface of the coated cobalt nanoparticles by exchange of the original polystyrene shell with other polymers. The reference further describes replacement of the polystyrene shell on coated nanoparticles by polymethylmethacrylate shell, through exchange reaction with polymethylmethacrylate (PMMA) in toluene. These polymer coated magnetic nanoparticle materials are also suitable for fabrication of magnetic inks. U.S. Publication No. 2007/0249747 to Tsuji et al. discloses fabrication of polymer-coated metal nanoparticles from magnetic FePt nanoparticles of a particle size of about 4 nm by stirring FePt nanoparticle dispersion in the presence of a —SH terminated polymer. Suitable polymers include for example PMMA.

The surface of magnetic nanoparticles can be modified: by grafting; atom transfer radical polymerization (ATRP) and reversible addition-fragmentation chain transfer (RAFT) polymerization techniques (the latter using a chain transfer agent but no metal catalyst); solvent evaporation method; layer by layer process; phase separation method; sol-gel transition; precipitation technique; heterogeneous polymerization in the presence of magnetic particles; suspension/emulsion polymerization; microemulsion polymerization; and dispersion polymerization.

In addition to the known methods described above, a number of specific techniques are of interest, such as for example, use of sonochemistry for chemical grafting of anti-oxidant molecules with additional hydrophobic polymer coating directly onto $TiO_2$ particle surfaces (Chem. Commun., 4815-4817 (2007)); use of pulse-plasma techniques (J. of Macromolecular Science, Part B: Physics, 45: 899-909 (2006)); use of supercritical fluids and anti-solvent process for coating/encapsulation of microparticles with a polymer (J. of Supercritical Fluids, 28: 85-890 (2004)); and use of electrohydrodynamic atomization for the production of narrow-size-distribution polymer-pigment-nanoparticle composites.

Suitable inorganic oxides for use as coating materials include silica, titania, zinc oxide and other similar inorganic oxides and mixtures thereof.

Methods for fabrication of such core-shell particles having a protective layer (shell) made out of inorganic oxide are described in, for example U.S. Patent Publication No. 2010/0304006, which describes a method wherein the silica coating on the surface of metal nanoparticles is provided by catalytic hydrolysis of a tetraalkoxysilane on the surface of metal nanoparticles. In order to avoid direct access of water to the surface of the metal nanoparticles, the process is carried in a medium containing an organic solvent like tetrahydrofuran (THF), in presence of only the required amount of water needed for hydrolysis/condensation of the silica precursor. Coated magnetic nanoparticles made by this method include Fe, Fe/Co alloys.

Bomati-Miguel et al., Journal of Magnetism and Magnetic Materials, 290-291: 272-275 (2005) describes one-step fabrication of silica coated iron nanoparticles by a continuous process involving laser-induced pyrolysis of ferrocene (the source of iron metal) and TEOS aerosols (the source of siloxane protective coating).

Ni et al., Materials Chemistry and Physics, 120: 206-212 (2010) reported deposition of a silica layer on iron nanoparticles dispersed in ethanol solution containing tetraethyl orthosilicate (TEOS) in presence of catalytic amounts of a solution of ammonia.

The general procedure for fabrication of metal oxide coated magnetic metal nanoparticles is based on controlled partial oxidation of the top layers of magnetic metal nanoparticles. For example, as disclosed in Turgut, Z et al., Journal of Applied Physics, 85 (8, Pt. 2A): 4406-4408 (1999), a thin iron oxide/cobalt oxide coating layer on FeCo nanoparticles was prepared by controlled oxidation of metal precursors particles with a plasma torch (Turgut, Z et al., Journal of Applied Physics (1999), 85(8, Pt. 2A), 4406-4408).

Various surfactants can be present on the surface of the magnetic metal nanoparticles. Examples include oleic acid, trioctyl phosphine oxide (TOPO), 1-butanol, tributyl phosphine and others. Typically the surfactant-coated nanoparticles are provided by performing the fabrication of metal nanoparticles from metal precursors, in the presence of a suitable surfactant in a solvent. Suitable methods providing surfactant coated magnetic metal nanoparticles in solvent include metal salts reduction by borohydrides (1. Guo et al. Phys. Chem. Chem. Phys., 3: 1661-5 (2001); reduction of metal salts by polyols (G. S. Chaubey et al., J. Am. Chem. Soc., 120: 7214-5 (2007)); and thermal decomposition of metal carbonyls (U.S. Pat. No. 7,407,572).

All of the above methods may be used to provide suitable coated magnetic nanoparticles needed for fabrication of a magnetic UV curable ink according to the present embodiments.

Magnetic Material

In embodiments, two types of magnetic metal based inks can be obtained by the process herein, depending on the particle size and shape: ferromagnetic ink and superparamagnetic ink.

In embodiments, the metal nanoparticles herein can be ferromagnetic. Ferromagnetic inks become magnetized by a magnet and maintain some fraction of the saturation magnetization once the magnet is removed. The main application of this ink is for Magnetic Ink Character Recognition (MICR) used for checks processing.

In embodiments, the metal nanoparticles herein can be superparamagnetic inks. Superparamagnetic inks are also magnetized in the presence of a magnetic field but they lose their magnetization in the absence of a magnetic field. The main application of superparamagnetic inks is for security printing, although not limited. In this case, an ink containing, for example, magnetic particles as described herein and carbon black appears as a normal black ink but the magnetic properties can be detected by using a magnetic sensor or a magnetic imaging device. Alternatively, a metal detecting device may be used for authenticating the magnetic metal property of secure prints prepared with this ink. A process for superparamagnetic image character recognition (i.e. using superparamagnetic inks) for magnetic sensing is described in U.S. Pat. No. 5,667,924, which is hereby incorporated by reference herein in its entirety.

As described above, the metal nanoparticles herein can be ferromagnetic or superparamagnetic. Superparamagnetic nanoparticles have a remnant magnetization of zero after being magnetized by a magnet. Ferromagnetic nanoparticles have a remnant magnetization of greater than zero after being magnetized by a magnet; that is, ferromagnetic nanoparticles maintain a fraction of the magnetization induced by the magnet. The superparamagnetic or ferromagnetic property of a nanoparticle is generally a function of several factors including size, shape, material selection, and temperature. For a given material, at a given temperature, the coercivity (i.e. ferromagnetic behavior) is maximized at a critical particle size corresponding to the transition from multidomain to single domain structure. This critical size is referred to as the critical magnetic domain size (Dc, spherical). In the single domain range there is a sharp decrease of the coercivity and remnant magnetization when decreasing the particle size, due to thermal relaxation. Further decrease of the particle size results in complete loss of induced magnetization because the thermal effect become dominant and are sufficiently strong to demagnetize previously magnetically saturated nanoparticles. Superparamagnetic nanoparticles have zero remanence and coercivity. Particles of a size of about and above the Dc are ferromagnetic. For example, at room temperature, the Dc for iron is about 15 nanometers for fcc cobalt is about 7 nanometers and for Nickel the value is about 55 nm. Further, iron nanoparticles having a particle size of 3, 8, and 13 nanometers are superparamagnetic while iron nanoparticles having a particle size of 18 to 40 nanometers are ferromagnetic. For alloys, the Dc value may change depending on the materials. For additional discussion of such details, see U.S. Patent Publication No. 20090321676 to Breton et al.; Burke, et al., Chemistry of Materials, pp. 4752-4761 (2002); B. D. Cullity and C. D. Graham, Introduction to Magnetic Materials, IEEE Press (Wiley), $2^{nd}$ Ed., Chapter 11, Fine Particles and Thin Films, pp. 359-364 (2009); Lu et al. Angew. Chem. Int. Ed. 46:1222-444 (2007), Magnetic Nanoparticles: Synthesis, Protection, Functionalization and Application, which are all hereby incorporated by reference herein in their entirety.

In embodiments, the nanoparticle may be a magnetic metallic nanoparticle, that includes, for example, Co and Fe (cubic), among others. Others include Mn, Ni and/or alloys made of all of the foregoing. Additionally, the magnetic nanoparticles may be bimetallic or trimetallic, or a mixture thereof. Examples of suitable bimetallic magnetic nanoparticles include, without limitation, CoPt, fcc phase FePt, fct phase FePt, FeCo, MnAl, MnBi, mixtures thereof, and the like. Examples of trimetallic nanoparticles can include, without limitation tri-mixtures of the above magnetic nanoparticles, or core/shell structures that form trimetallic nanoparticles such as co-covered fct phase FePt.

The magnetic nanoparticles may be prepared by any method known in the art, including ball-milling attrition of larger particles (a common method used in nano-sized pigment production), followed by annealing. The annealing is generally necessary because ball milling produces amorphous nanoparticles, which need to be subsequently crystallized into the required single crystal form. The nanoparticles can also be made directly by RF plasma. Appropriate large-scale RF plasma reactors are available from Tekna Plasma Systems (Sherbrooke, Québec).

The average particle size of the magnetic nanoparticles may be, for example, about 3 nm to about 300 nm in size in all dimensions. They can be of any shape including spheres, cubes and hexagons. In one embodiment, the nanoparticles are about 5 nm to about 500 nm in size, such as from about 10 nm to about 300 nm, or from 20 nm to about 250 nm, although the amount can be outside of these ranges. Herein, "average" particle size is typically represented as $d_{50}$, or defined as the median particle size value at the 50 th percentile of the particle size distribution, wherein 50% of the particles in the distribution are greater than the $d_{50}$ particle size value, and the other 50% of the particles in the distribution are less than the $d_{50}$ value. Average particle size can be measured by methods that use light scattering technology to infer particle size, such as Dynamic Light Scattering. The particle diameter refers to the length of the pigment particle as derived from images of the particles generated by Transmission Electron Microscopy (TEM) or from Dynamic Light Scattering measurements.

The magnetic nanoparticles may be in any shape. Exemplary shapes of the magnetic nanoparticles can include, for example, without limitation, needle-shape, granular, globular, platelet-shaped, acicular, columnar, octahedral, dodecahedral, tubular, cubical, hexagonal, oval, spherical, dendritic, prismatic, amorphous shapes, and the like. An amorphous shape is defined in the context of the present embodiments as an ill-defined shape having recognizable shape. For example an amorphous shape has no clear edges or angles. The ratio of the major to minor size axis of the single nanocrystal (D major/D minor) can be less than about 10:1, such as from about less than about 3:2, or less than about 2:1. In a particular embodiment, the magnetic metal core has a needle-like shape with an aspect ratio of from about 3:2 to about 10:1.

The loading requirements of the magnetic nanoparticles in the ink may be from about 0.5 weight percent to about 30 weight percent, such as from about 5 weight percent to about 10 weight percent, or from about 6 weight percent to about 8 weight percent, although the amount can be outside of these ranges.

The magnetic nanoparticle can have a remanence of about 20 emu/g to about 100 emu/g, such as from about 30 emu/g to about 80 emu/g, or about 50 emu/g to about 70 emu/g, although the amount can be outside of these ranges.

The coercivity of the magnetic nanoparticle can be, for example, about 200 Oersteds to about 50,000 Oersteds, such as from about 1,000 Oersteds to about 40,000 Oersteds, or from about 10,000 Oersteds to about 20,000 Oersteds, although the amount can be outside of these ranges.

The magnetic saturation moment may be, for example, about 20 emu/g to about 150 emu/g, such as from about 30 emu/g to about 120 emu/g, or from about 40 emu/g to about 80 emu/g, although the amount can be outside of these ranges.

Carrier Material

The ink composition also includes a carrier material, or a mixture of two or more carrier materials.

In the case of a radiation (such as ultraviolet light) curable ink composition, the ink composition comprises a curable carrier material, a photoinitiator, an optional colorant, and additional additives. The curable carrier material is typically a curable monomer, curable oligomer, and the like. The curable carrier may, in embodiments, include one or more of these materials, including mixtures thereof. The curable materials are typically liquid at 25° C. The curable ink composition can further include other curable materials, such as a curable wax or the like, in addition to the colorant and other additives described above. The term "curable" refers, for example, to the component or combination being polymerizable, that is, a material that may be cured via polymerization, including, for example, free radical routes, and/or in which polymerization is photoinitiated though use of a radiation sensitive photoinitiator. Thus, for example, the term "radiation curable" refers is intended to cover all forms of curing upon exposure to a radiation source, including light and heat sources and including in the presence or absence of initiators. Example radiation curing routes include, but are not limited to, curing using ultraviolet (UV) light, for example having, a wavelength of 200-400 nm or more rarely visible light, such as in the presence of photoinitiators and/or sensitizers, curing using e-beam radiation, such as in the absence of photoinitiators, curing using thermal curing in the presence or absence of high temperature thermal initiators (and which are generally largely inactive at the jetting temperature), and appropriate combinations thereof.

Suitable radiation-(such as UV-) curable monomers and oligomers include, but are not limited to, acrylated esters, acrylated polyesters, acrylated ethers, acrylated polyethers, acrylated epoxies, urethane acrylates, and pentaerythritol tetraacrylate. Specific examples of suitable acrylated oligomers include, but are not limited to, acrylated polyester oligomers, such as CN2262 (Sartomer Co.), EB 812 (Cytec Surface Specialties), EB 810 (Cytec Surface Specialties), CN2200 (Sartomer Co.), CN2300 (Sartomer Co.), and the like, acrylated urethane oligomers, such as EB270 (Cytec Surface Specialties), EB 5129 (Cytec Surface Specialties), CN2920 (Sartomer Co.), CN3211 (Sartomer Co.), and the like, and acrylated epoxy oligomers, such as EB 600 (Cytec Surface Specialties), EB 3411 (Cytec Surface Specialties), CN204 (Sartomer Co.), CN110 (Sartomer Co.), and the like; and pentaerythritol tetraacrylate oligomers, such as SR399LV (Sartomer Co.) and the like. Specific examples of suitable acrylated monomers include, but are not limited to) polyacrylates, such as trimethylol propane triacrylate, pentaerythritol tetraacrylate, pentaerythritol triacrylate, dipentaerythritol pentaacrylate, glycerol propoxy triacrylate, tris(2-hydroxyethyl) isocyanurate triacrylate, pentaacrylate ester, and the like, epoxy acrylates, urethane acrylates, amine acrylates, acrylic acrylates, and the like. Mixtures of two or more materials can also be employed as the reactive monomer. Suitable reactive monomers are commercially available from, for example, Sartomer Co., Inc., BASF Corporation, Rahn AG., and the like. In embodiments, the at least one radiation curable oligomer and/or monomer can be cationically curable, radically curable, or the like.

The curable monomer or oligomer in embodiments is included in the ink in an amount of, for example, about 20 to about 90 weight percent of the ink, such as about 30 to about 85 weight percent, or about 40 to about 80 weight percent, although the amount can be outside of these ranges. In embodiments, mixtures of curable monomer optionally with oligomer are selected to have a viscosity at 25° C. of about 1 to about 50 cP, such as about 1 to about 40 cP or about 10 to about 30 cP, although the amount can be outside of these ranges. In one embodiment, the mixture of curable monomer and oligoether has a viscosity at 25° C. of about 20 cP. Also, in some embodiments, it is desired that the curable monomer or oligomer is not a skin irritant, so that uncured ink compositions are not irritable to users.

Initiator

The ink compositions further comprise an initiator. Examples of free radical initiators include benzyl ketones, monomeric hydroxyl ketones, polymeric hydroxyl ketones, α-amino ketones, acyl phosphine oxides, metallocenes, benzophenone, benzophenone derivatives, and the like. Specific examples include 1-hydroxy-cyclohexylphenylketone, benzophenone, 2-benzyl-2-(dimethylamino)-1-(4-(4-morpholinyl)phenyl)-1-butanone, 2-methyl-1-(4-methylthio)phenyl-2-(4-morpholinyl)-1-propanone, diphenyl-(2,4,6-trimethylbenzoyl) phosphine oxide, phenyl bis(2,4,6-trimethylbenzoyl) phosphine oxide, benzyl-dimethylketal, isopropylthioxanthone (DAROCUR ITX, available from BASF), 2,4,6-trimethylbenzoyldiphenylphosphine oxide (available as BASF LUCIRIN TPO), 2,4,6-trimethylbenzoylethoxyphenylphosphine oxide (available as BASF LUCIRIN TPO-L), bis(2,4,6-trimethylbenzoyl)-phenylphosphine oxide (available as BASF IRGACURE 819) and other acyl phosphines, 2-methyl-1-(4-methylthio)phenyl-2-(4-morpholinyl)-1-propanone (available as BASF IRGACURE 907) and 1-(4-(2-hydroxyethoxy)phenyl)-2-hydroxy-2-methylpropan-1-one (available as BASF IRGACURE 2959), 2-benzyl 2-dimethylamino 1-(4-morpholinophenyl) butanone-1 (available as BASF IRGACURE 369), 2-hydroxy-1-(4-(4-(2-hydroxy-2-methylpropionyl)-benzyl)-phenyl)-2-methylpropan-1-one (available as BASF IRGACURE 127), 2-dimethylamino-2-(4-methylbenzyl)-1-(4-morpholin-4-ylphenyl)-butanone (available as BASF IRGACURE 379), titanocenes, isopropylthioxanthone, 1-hydroxy-cyclohexylphenylketone, 2,4,6-trimethylbenzophenone, 4-methylbenzophenone, 2,4,6-trimethylbenzoylphenylphosphinic acid ethyl ester, oligo(2-hydroxy-2-methyl-1-(4-(1-methylvinyl)phenyl) propanone), 2-hydroxy-2-methyl-1-phenyl-1-propanone, benzyl-dimethylketal, isopropyl-9H-thioxanthen-9-one, alpha amino ketone (IRGACURE 379), and the like, as well as mixtures thereof.

Optionally, the curable inks can also contain an amine synergist, which are co-initiators which can donate a hydrogen atom to a photoinitiator and thereby form a radical species that initiates polymerization, and can also consume dissolved oxygen, which inhibits free-radical polymerization, thereby increasing the speed of polymerization. Examples of suitable amine synergists include (but are not limited to) ethyl-4-dimethylaminobenzoate, 2-ethylhexyl-4-dimethylaminobenzoate, and the like, as well as mixtures thereof.

Initiators for inks disclosed herein can absorb radiation at any desired or effective wavelength, in one embodiment at least about 200 nanometers, and in one embodiment no more than about 560 nanometers, and in another embodiment no more than about 420 nanometers, although the wavelength can be outside of these ranges.

The initiator can be present in the ink in any desired or effective amount, in one embodiment at least about 0.5 percent by weight of the carrier, and in another embodiment at least about 1 percent by weight of the carrier, and in one embodiment no more than about 15 percent by weight of the carrier, and in another embodiment no more than about 10 percent by weight of the carrier, although the amount can be outside of these ranges.

Colorants

The MICR ink as prepared is either black or dark brown. In further embodiments, the MICR ink according to the present disclosure may be further produced as a colored ink by adding a colorant during ink production. Alternatively, a MICR ink lacking a colorant may be printed on a substrate during a first pass, followed by a second pass, wherein a colored ink that is lacking MICR particles is printed directly over the colored ink, so as to render the colored ink MICR-readable. This can be achieved through any means known in the art. For example, each ink can be stored in a separate reservoir. The printing system delivers each ink separately to the substrate, and the two inks interact. The inks may be delivered to the substrate simultaneously or consecutively. Any desired or effective colorant can be employed in the ink compositions, including pigment, dye, mixtures of pigment and dye, mixtures of pigments, mixtures of dyes, and the like. The coated magnetic nanoparticles may also, in embodiments, impart some or all of the colorant properties to the MICR ink composition.

Suitable colorants for use in the MICR ink according to the present disclosure include, without limitation, carbon black, lamp black, iron black, ultramarine, Nigrosine dye, Aniline Blue, Du Pont Oil Red, Quinoline Yellow, Methylene Blue Chloride, Phthalocyanine Blue, Phthalocyanine Green, Rhodamine 6C Lake, Chrome Yellow, quinacridone, Benzidine Yellow, Malachite Green, Hansa Yellow C, Malachite Green hexylate, oil black, azo oil black, Rose Bengale, monoazo pigments, disazo pigments, trisazo pigments, tertiary-ammonium salts, metallic salts of salicylic acid and salicylic acid derivatives, Fast Yellow G3, Hansa Brilliant Yellow 5GX, Disazo Yellow AAA, Naphthol Red HFG, Lake Red C, Benzimidazolone Carmine HF3CS, Dioxazine Violet, Benzimidazolone Brown HFR. Aniline Black, titanium oxide, Tartrazine Lake, Rhodamine 6G Lake, Methyl Violet Lake, Basic 6G Lake, Brilliant Green lakes, Hansa Yellow, Naphtol Yellow, Watching Red, Rhodamine B, Methylene Blue, Victoria Blue, Ultramarine Blue, and the like.

The amount of colorant can vary over a wide range, for instance, from about 0.1 to about 50 weight percent, or from about 3 to about 20 weight percent, and combinations of colorants may be used.

Additional Additives

The ink of the present embodiments may further contain one or more additives for their known purposes. For example, suitable additives include, a wax, a dispersant, a cross-linking agent, a stabilizer, a viscosity modifier, an antioxidant and a gellant.

Wax

The cured images are very robust and one or more waxes may be added to the MICR inkjet ink. The wax can be present in an amount of, for example, from about 0.1 to about 10 weight percent, or from about 1 to about 6 weight percent based on the total weight of the ink composition, although the amount can be outside of these ranges. Examples of suitable waxes include, but are not limited to, polyolefin waxes, such as low molecular weight polyethylene, polypropylene, copolymers thereof and mixtures thereof. Other examples include a polyethylene wax, a polypropylene wax, a fluorocarbon-based wax (Teflon), or Fischer-Tropsch wax, although other waxes can also be used.

In one specific embodiment the wax can be a curable wax. These waxes can be synthesized by the reaction of a wax containing a transformable functional group, such as carboxylic acid or hydroxyl with a reagent containing curable or polymerizable groups. Suitable examples of waxes containing hydroxyl groups include hydroxyl-terminated polyethylene waxes and Guerbet alcohols which are characterized as 2,2-dialkyl-1 ethanols. Suitable waxes containing carboxylic acid transformable group include carboxylic acid terminated polyethylenes and Guerbet acids which are characterized as 2,2-dialkyl ethanoic acids. The curable groups present can include, but are not limited to, acrylate, methacrylate, alkene, alkyne, vinyl, and allylic ether.

The wax can be present in the ink in any desired or effective amount, in one embodiment at least about 1 percent, in another embodiment at least about 2 percent, and in yet another embodiment at least about 3 percent, and in one embodiment no more than about 40 percent, in another embodiment no more than about 30 percent, and in yet another embodiment no more than about 20 percent, by weight of the ink carrier, although the amounts can be outside of these ranges.

Gellant

The ink composition can also optionally contain a gellant. The gellant can function to increase dramatically the viscosity of the radiation curable phase change ink within a desired temperature range. In particular, the gellant can form a semi-solid gel in the ink carrier at temperatures below the specific temperature at which the ink is jetted. The semi-solid gel phase in a specific embodiment is a physical gel that exists as a dynamic equilibrium comprising one or more solid gellant molecules and a liquid solvent. The semi-solid gel phase is believed to be a dynamic networked assembly of molecular components held together by non-covalent bonding interactions such as hydrogen bonding, Van der Waals interactions, aromatic non-bonding interactions, ionic or coordination bonding, London dispersion forces, or the like, which upon stimulation by physical forces such as temperature or mechanical agitation or chemical forces such as pH or ionic strength, can undergo a reversible transition from liquid to semi-solid state at the macroscopic level. The inks exhibit a thermally reversible transition between the semi-solid gel state and the liquid state when the temperature is varied above or below the gel phase transition of the ink. This reversible cycle of transitioning between semi-solid gel phase and liquid phase can be repeated many times in the ink formulation. Mixtures of one or more gellants can be used to effect the phase-change transition.

Specific examples of gellants include curable amide gellants as disclosed in U.S. Pat. No. 7,714,040, trans-1,2-cyclohexane bis(urea-urethane) compounds as disclosed in, for example, U.S. Pat. No. 7,153,349, curable epoxy-polyamides as disclosed in, for example, U.S. Pat. No. 7,563,489, the disclosure of all of which are totally incorporated herein by reference.

Examples of suitable gellant materials include, but are not limited to, curable amide gellants as disclosed in U.S. Pat. No. 7,714,040, the disclosure of which is totally incorporated herein by reference, such as those of the formula wherein:

$R_1$ and $R_1'$ each, independently of the other, is: (i) an alkyl group, (ii) an arylalkyl group, or (iii) an alkylaryl group; $R_2$ and $R_2'$ each, independently of the other, are: (i) alkylene groups, (ii) arylene groups, (iii) arylalkylene groups, or (iv) alkylarylene groups; $R_3$ is: (i) an alkylene group, (ii) an arylene group, (iii) an arylalkylene group, or (iv) an alkylarylene group; and n is an integer representing the number of repeat amide units, being in one embodiment at least 1, and in one embodiment no more than about 20, in another embodiment no more than about 15, and in yet another embodiment no more than about 10, although the value of n can be outside of these ranges.

Other examples of suitable gellants are compounds are those described in U.S. Pat. Nos. 7,276,614 and 7,279,587, the entire disclosures of which are incorporated herein by reference.

As described in U.S. Pat. No. 7,279,587, the amide gellant may be a compound of the formula wherein:

$R_1$ is:

(i) an alkylene group (wherein an alkylene group is a divalent aliphatic group or alkyl group, including linear and branched, saturated and unsaturated, cyclic and acyclic, and substituted and unsubstituted alkylene groups, and wherein heteroatoms, such as oxygen, nitrogen, sulfur, silicon, phosphorus, boron, and the like either may or may not be present in the alkylene group) having from about 1 carbon atom to about 12 carbon atoms, such as from about 1 carbon atom to about 8 carbon atoms or from about 1 carbon atom to about 5 carbon atoms, (ii) an arylene group (wherein an arylene group is a divalent aromatic group or aryl group, including substituted and unsubstituted arylene groups, and wherein heteroatoms, such as oxygen, nitrogen, sulfur, silicon, phosphorus, boron, and the like either may or may not be present in the arylene group) having from about 1 carbon atom to about 15 carbon atoms, such as from about 3 carbon atoms to about 10 carbon atoms or from about 5 carbon atoms to about 8 carbon atoms, (iii) an arylalkylene group (wherein an arylalkylene group is a divalent arylalkyl group, including substituted and unsubstituted arylalkylene groups, wherein the alkyl portion of the arylalkylene group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the arylalkylene group) having from about 6 carbon atoms to about 32 carbon atoms, such as from about 6 carbon atoms to about 22 carbon atoms or from about 6 carbon atoms to about 12 carbon atoms, or (iv) an alkylarylene group (wherein an alkylarylene group is a divalent alkylaryl group, including substituted and unsubstituted alkylarylene groups, wherein the alkyl portion of the alkylarylene group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the alkylarylene group) having from about 5 carbon atoms to about 32 carbon atoms, such as from about 6 carbon atoms to about 22 carbon atoms or from about 7 carbon atoms to about 15 carbon atoms, wherein the substituents on the substituted alkylene, arylene, arylalkylene, and alkylarylene groups can be halogen atoms, cyano groups, pyridine groups, pyridinium groups, ether groups, aldehyde groups, ketone groups, ester groups, amide groups, carbonyl groups, thiocarbonyl groups, sulfide groups, nitro groups, nitroso groups, acyl groups, azo groups, urethane groups, urea groups, mixtures thereof, and the like, wherein two or more substituents can be joined together to form a ring;

$R_2$ and $R_2'$ each, independently of the other, are:

(i) alkylene groups having from about 1 carbon atom to about 54 carbon atoms, such as from about 1 carbon atom to about 48 carbon atoms or from about 1 carbon atom to about 36 carbon atoms,

(ii) arylene groups having from about 5 carbon atoms to about 15 carbon atoms, such as from about 5 carbon atoms to about 13 carbon atoms or from about 5 carbon atoms to about 10 carbon atoms, (iii) arylalkylene groups having from about 6 carbon atoms to about 32 carbon atoms, such as from about 7 carbon atoms to about 33 carbon atoms or from about 8 carbon atoms to about 15 carbon atoms, or

(iv) alkylarylene groups having from about 6 carbon atoms to about 32 carbon atoms, such as from about 6 carbon atoms to about 22 carbon atoms or from about 7 carbon atoms to about 15 carbon atoms, wherein the substituents on the substituted alkylene, arylene, arylalkylene, and alkylarylene groups may be halogen atoms, cyano groups, ether groups, aldehyde groups, ketone groups, ester groups, amide groups, carbonyl groups, thiocarbonyl groups, phosphine groups, phosphonium groups, phosphate groups, nitrile groups, mercapto groups, nitro groups, nitroso groups, acyl groups, acid anhydride groups, azide groups, azo groups, cyanato groups, urethane groups, urea groups, mixtures thereof, and the like, and wherein two or more substituents may be joined together to form a ring;

$R_3$ and $R_3'$ each, independently of the other, are either: (a) photoinitiating groups, such as groups derived from 1-(4-(2-hydroxyethoxy)phenyl)-2-hydroxy-2-methylpropan-1-one, of the formula groups derived from 1-hydroxycyclohexylphenylketone, of the formula groups derived from 2-hydroxy-2-methyl-1-phenylpropan-1-one, of the formula groups derived from N,N-dimethylethanolamine or N,N-dimethylethylenediamine, or the like, or:

(b) a group which is:

(i) an alkyl group (including linear and branched, saturated and unsaturated, cyclic and acyclic, and substituted and unsubstituted alkyl groups, and wherein heteroatoms, such as oxygen, nitrogen, sulfur, silicon, phosphorus, boron, and the like either may or may not be present in the alkyl group) having from about 2 carbon atoms to about 100 carbon atoms, such as from about 3 carbon atoms to about 60 carbon atoms or from about 4 carbon atoms to about 30 carbon atoms, (ii) an aryl group (including substituted and unsubstituted aryl groups, and wherein heteroatoms, such as oxygen, nitrogen, sulfur, silicon, phosphorus, boron, and the like either may or may not be present in the aryl group) having from about 5 carbon atoms to about 100 carbon atoms, such as from about 5 carbon atoms to about 60 carbon atoms or from about 6 carbon atoms to about 30 carbon atoms, such as phenyl or the like, (iii) an arylalkyl group (including substituted and unsubstituted arylalkyl groups, wherein the alkyl portion of the arylalkyl group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the arylalkyl group) having from about 5 carbon atoms to about 100 carbon atoms, such as from about 5 carbon atoms to about 60 carbon atoms or from about 6 carbon atoms to about 30 carbon atoms, such as benzyl or the like, or (iv) an alkylaryl group (including substituted and unsubstituted alkylaryl groups, wherein the alkyl portion of the alkylaryl group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the alkylaryl group) having from about 5 carbon atoms to about 100 carbon atoms, such as from about 5 carbon atoms to about 60 carbon atoms or from about 6 carbon atoms to about 30 carbon atoms, such as tolyl or the like, wherein the substituents on the substituted alkyl, arylalkyl, and alkylaryl groups may be halogen atoms, ether groups, aldehyde groups, ketone groups, ester groups, amide groups, carbonyl groups, thiocarbonyl groups, sulfide groups, phosphine groups, phosphonium groups, phosphate groups, nitrile groups, mercapto groups, nitro groups, nitroso groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, and wherein two or more substituents may be joined together to form a ring; and X and X' each, independently of the other, is an oxygen atom or a group of the formula —NR$_4$—, wherein R$_4$ is:

(i) a hydrogen atom;

(ii) an alkyl group, including linear and branched, saturated and unsaturated, cyclic and acyclic, and substituted and unsubstituted alkyl groups, and wherein heteroatoms either may or may not be present in the alkyl group, having from about 5 carbon atoms to about 100 carbon atoms, such as from about 5 carbon atoms to about 60 carbon atoms or from about 6 carbon atoms to about 30 carbon atoms,

(iii) an aryl group, including substituted and unsubstituted aryl groups, and wherein heteroatoms either may or may not be present in the aryl group, having from about 5 carbon atoms to about 100 carbon atoms, such as from about 5 carbon atoms to about 60 carbon atoms or from about 6 carbon atoms to about 30 carbon atoms, (iv) an arylalkyl group, including substituted and unsubstituted arylalkyl groups, wherein the alkyl portion of the arylalkyl group may be linear or branched, saturated or unsaturated, and cyclic or acyclic, and wherein heteroatoms either may or may not be present in either the aryl or the alkyl portion of the arylalkyl group, having from about 5 carbon atoms to about 100 carbon atoms, such as from about 5 carbon atoms to about 60 carbon atoms or from about 6 carbon atoms to about 30 carbon atoms, or

(v) an alkylaryl group, including substituted and unsubstituted alkylaryl groups, wherein the alkyl portion of the alkylaryl group can be linear or branched, saturated or unsaturated, and cyclic or acyclic, and wherein heteroatoms either may or may not be present in either the aryl or the alkyl portion of the alkylaryl group, having from about 5 carbon atoms to about 100 carbon atoms, such as from about 5 carbon atoms to about 60 carbon atoms or from about 6 carbon atoms to about 30 carbon atoms, wherein the substituents on the substituted alkyl, aryl, arylalkyl, and alkylaryl groups may be halogen atoms, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, and wherein two or more substituents may be joined together to form a ring.

Also suitable as gellants are aromatic ester-terminated diamide compounds of the formula wherein $R_1$ and $R_1'$ can be the same or different and wherein $R_1$ and $R_1'$ each, independently of the other, can be groups such as $R_2$ and $R_2'$ include groups such as isomers of the formula —$C_{34}H_{56+a}$— which are branched alkylene groups which may include unsaturations and cyclic groups, wherein a is an integer of 0, 1, 2, 3, 4, 5, 6, 7, 8, 9, 10, 11, or 12, and $R_3$ includes groups such as —$CH_2CH_2$—, as disclosed in, for example, U.S. application Ser. No. 12/765,148, filed Apr. 22, 2010, entitled "Amide Gellant Compounds with Aromatic End Groups," with the named inventors Naveen Chopra, Michelle N. Chrétien, Barkev Keoshkerian, Jennifer L. Belelie, and Peter G. Odell, the disclosure of which is totally incorporated herein by reference.

Also suitable as gellants are trans-1,2-cyclohexane bis(urea-urethane) compounds as disclosed in, for example, U.S. Pat. No. 7,153,349, the disclosure of which is totally incorporated herein by reference, such as those of the formula or mixtures thereof, wherein $R_1$ and $R'_1$ each, independently of the other, is (i) an alkylene group, (ii) an arylene group, (iii) an arylalkylene group, or (iv) an alkylarylene group, $R_2$ and $R'_2$ each, independently of the other, is (i) an alkyl group, (ii) an aryl group, (iii) an arylalkyl group, or (iv) an alkylaryl group, $R_3$ and $R'_3$ each, independently of the other, is a hydrogen atom or an alkyl group, $R_4$ and $R'_4$ each, independently of the other, is a hydrogen atom, a fluorine atom, an alkyl group, or a phenyl group, n is an integer of 0, 1 2, 3, or 4, and each $R_5$, independently of the others, is (i) an alkyl group, (ii) an aryl group, (iii) an arylalkyl group, (iv) an alkylaryl group, or (v) a substituent other than an alkyl, aryl, arylalkyl, or alkylaryl group.

Antioxidant

The ink composition can also optionally contain an antioxidant. The optional antioxidants of the ink compositions protect the images from oxidation and also protect the ink components from oxidation during the heating portion of the ink preparation process. Specific examples of suitable antioxidants include NAUGUARD® series of antioxidants such as NAUGUARD® 445, NAUGUARD® 524, NAUGUARD® 76, and NAUGUARD® 5112 (commercially available from Chemtura Corporation, Philadelphia, Pa.), the IRGANOX® series of antioxidants such as IRGANOX® 10310 (commercially available from BASF), and the like. When present, the optional antioxidant can be present in the ink in any desired or effective amount, such as in an amount of from at least about 0.01 to about 20 percent by weight of the ink, such as about 0.1 to about 5 percent by weight of the ink, or from about 1 to about 3 percent by weight of the ink, although the amount can be outside of these ranges.

Viscosity Modifier

The ink composition can also optionally contain a viscosity modifier. In particular embodiments, the viscosity controlling agent may be selected from the group consisting of aliphatic ketones, such as stearone, and the like, polymers such as polystyrene, polymethylmethacrylate, and the like, and thickening agents such as those available from BYK Chemie. When present, the optional viscosity modifier can be present in the ink in any desired or effective amount, such as about 0.1 to about 99 percent by weight of the ink, such as about 1 to about 30 percent by weight of the ink, or about 10 to about 15 percent by weight of the ink, although the amount can be outside of these ranges.

Dispersants

Dispersant may be optionally present in then ink formulation. The role of the dispersant is to further ensure improved dispersion stability of the coated magnetic nanoparticles by stabilizing interactions with the coating material. Suitable dispersants include but not limited to, oleic acid, trioctyl phosphine oxide (TOPO), hexyl phosphonic acid (HPA), polyvinylpyrrolidone (PVP), and combinations thereof. Additional suitable dispersants include beta hydroxy carboxylic acids and their esters containing long linear, cyclic or branched aliphatic chains, such as those having about 5 to about 60 carbons, such as pentyl, hexyl, cyclohexyl, heptyl, octyl, nonyl, decyl, undecyl, and the like; sorbitol esters with long chain aliphatic carboxylic acids such as lauric acid, oleic acid (SPAN® 85), palmitic acid (SPAN® 40), and stearic acid (SPAN® 60); polymeric compounds such as polyvinylpyrrolidone, poly(1-vinylpyrrolidone)-graft-(1-hexadecene), poly(1-vinylpyrrolidone)-graft-(1-triacontene), poly(1 vinylpyrrolidone-co-acrylic acid), and combinations thereof. In embodiments, the dispersant is selected from the group consisting of oleic acid, lauric acid, palmitic acid, stearic acid, trioctyl phosphine oxide, hexyl phosphonic acid, polymeric compounds like polyvinylpyrrolidone, poly(1-vinylpyrrolidone)-graft-(1-hexadecene), poly(1-vinylpyrrolidone)-graft-(1-triacontene), poly(1 vinylpyrrolidone-co-acrylic acid), pentyl, hexyl, cyclohexyl, heptyl, octyl, nonyl, decyl, or undecyl beta-hydroxy carboxylic acid, sorbitol esters with long chain carboxylic acid and combinations thereof. Suitable dispersants also include the SOLSPERSE series from Lubrizol Corp (Wickliffe, Ohio), which comprise sulfonic groups; the EFKA series of dispersants including brand numbers 4340, 4585, 7476, 7496 from BASF; and Byk 2001 or Byk 2155 from Bykchemie.

A suitable amount of dispersant can be selected, such as in an amount of about 0.1 to about 10 weight percent, such as from about 0.2 to about 5 weight percent of the ink weight, although the amount can be outside of these ranges. The choice of particular dispersants or combinations thereof as well as the amounts of each to be used are within the purview of those skilled in the art.

Preparation of Ink

The ink composition of the present disclosure can be prepared by any desired or suitable method. For example, in the case of curable gel UV inks the ink ingredients can be mixed together, followed by heating, typically to a temperature of from about 50° C. to about 100° C., although the temperature can be outside of this range, and stirring until a homogeneous ink composition is obtained, followed by cooling the ink to ambient temperature (typically from about 20° C. to about 25° C.). In the case of liquid ink compositions, the ink ingredients can simply be mixed together with stirring to provide a homogeneous composition, although heating can also be used if desired or necessary to help form the composition. Other methods for making ink compositions are known in the art and will be apparent based on the present disclosure.

Printing of the Ink

The magnetic metal particle ink may generally be printed on a suitable substrate such as, without limitation, paper, glass art paper, bond paper, paperboard, Kraft paper, cardboard, semi-synthetic paper or plastic sheets, such as polyester or polyethylene sheets, and the like. These various substrates can be provided in their natural state, such as uncoated paper, or they can be provided in modified forms, such as coated or treated papers or cardboard, printed papers or cardboard, and the like.

Specific suitable papers include plain papers such as XEROX 4200 papers, XEROX Image Series papers, ruled notebook paper, bond paper, silica coated papers such as Sharp Company silica coated paper, JuJo paper, HAMMERMILL LASERPRINT paper, and the like, glossy coated papers such as XEROX Digital Color Gloss, Sappi Warren Papers LUSTROGLOSS, specialty papers such as Xerox DURAPAPER, and the like.

Further suitable materials may be used, including but not limited to, transparency materials, fabrics, textile products, plastics, polymeric films, inorganic recording mediums such as metals and wood, and the like, transparency materials, fabrics, textile products, plastics, polymeric films, inorganic substrates such as metals and wood, and the like.

The ink of the present disclosure may be used in both MICR and non-MICR applications.

The inks described herein are further illustrated in the following examples. All parts and percentages are by weight unless otherwise indicated.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

While the description above refers to particular embodiments, it will be understood that many modifications may be made without departing from the spirit thereof. The accompanying claims are intended to cover such modifications as would fall within the true scope and spirit of embodiments herein.

The presently disclosed embodiments are, therefore, to be considered in all respects as illustrative and not restrictive, the scope of embodiments being indicated by the appended claims rather than the foregoing description. All changes that come within the meaning of and range of equivalency of the claims are intended to be embraced therein.

EXAMPLES

The examples set forth herein below and are illustrative of different compositions and conditions that can be used in practicing the present embodiments. All proportions are by weight unless otherwise indicated. It will be apparent, however, that the present embodiments can be practiced with many types of compositions and can have many different uses in accordance with the disclosure above and as pointed out hereinafter.

Example 1

Fabrication of a Magnetic Ink Concentrate with Carbon Coated Magnetic Nanoparticles To an attritor loaded with stainless steel shot (1,800 g) was added a propoxylated neopentyl diacrylate curable monomer (SR9003, 57.6 g, obtained from Sartomer Co. Inc., Exeter, Pa.) and 27.4 g of EFKA 4340 (a dispersant consisting of an acrylic block copolymer in methoxypropanol available from formerly Ciba now BASF; the methoxypropanol was removed by distillation before use). The resulting mixture was stirred at 200 r.p.m., while the dispersion was kept below 50° C. Then were added 15 g of carbon-coated iron nanoparticles (obtained from Nanoshel Corporation, Wilmington, Del., having an average particle diameter of 25 nm) over a 1 minute period. This mixture was then stirred for 20 hours and then sieved to remove the stainless steel shot to afford a concentrate dispersion of carbon-coated iron particles (about 15% concentration).

Example 2

Fabrication of a Magnetic Ink Concentrate with Silica-coated Magnetic Nanoparticles Silica coated iron nanoparticles of an average particle size of 300 nm are synthesized by reduction of FeCl3.6H2O with NaOH/N2H4.H2O reducing agent. After washing with ethanol, a silica coating is deposed by using the Stöber method. In this procedure, the silica layer is deposed from a tetraethyl orthosilicate precursor, which is hydrolyzed in an ammonia/water mixture at apH of 8-9 for 4 hours at 40° C. The procedure for fabrication of silica coated iron nanoparticles is fully described by Ni et al., in Materials Chemistry and Physics 10: 206-212 (2010).

The magnetic ink concentrate fabrication procedure described in Example 1 is repeated by replacing carbon coated nanoparticles with 15 g of silica coated iron coated nanoparticles as described above. The procedure afforded an UV curable magnetic ink concentrate containing silica-coated iron nanoparticles.

Example 3

Fabrication of UV Curable Magnetic Ink Containing Carbon Coated Iron Nanoparticles 10 g of ink with 13 wt % carbon-coated iron magnetic particles was prepared by mixing 8.73 g of the 15 wt % magnetic iron nanoparticles dispersion, 0.5 g dipentaerythritol pentaacrylate curable monomer (SR399LV, obtained from Sartomer Corporation), 0.3 g IRGACURE 379 photoinitiator (2-(4-methylbenzyl)-2-(dimethylamino)-1-(4-morpholinophenyl)butan-1-one, obtained from BASF Corporation, Wilmington, Del.), 0.1 g IRGACURE 819 photoinitiator (bis (2,4,6-trimethylbenzoyl)-phenylphosphineoxide, obtained from BASF Corporation), 0.35 g IRGACURE 127 photoinitiator (2-hydroxy-1-{4-[4-(2-hydroxy-2-methyl-propionyl)-benzyl]-phenyl}-2-methyl-propan-1-one, obtained from BASF Corporation), and 0.02 g IRGASTAB UV10 (in-can nitroxide-based stabilizer, obtained from BASF Corporation). The resulting mixture was stirred in a glass bottle at 85° C. for 2 hours. The ink is filtered under pressure through a heated 1 um filter apparatus to furnish the final ink.

Example 4

Fabrication of UV Curable Magnetic Ink Containing Silica Coated Iron Nanoparticles The procedure from Example 3 is repeated by replacing the ink concentrate containing carbon coated iron nanoparticles (from Example 1) with 8.7 g of ink concentrate containing silica-coated iron nanoparticles (from Example 2), to provide 10 g of a curable ink containing 13% silica coated iron nanoparticles.

Example 5

General Procedure for Fabrication of UV Curable Magnetic Ink

The procedure described in Example 3 is repeated by changing the amounts of ink components within the ranges shown in Table 1. It is understood that when selecting specific amounts for individual ink components, the sum of all the components in the final ink adds to 100%.

TABLE 1

(ink with no gellant)

| Component | Weight % |
|---|---|
| SR9003 monomer | 10-15% |
| SR399LV monomer | 3-10% |

TABLE 1-continued (ink with no gellant)

| Component | Weight % |
|---|---|
| IRGACURE 379 | 1-5% |
| IRGACURE 819 | 1-5% |
| IRGACURE 127 | 1-5% |
| IRGASTAB UV10 | 0-3% |
| 15 wt % magnetic particle dispersion/SR9003 | 60-80% |
| Total | 100 |

Example 6

Fabrication of a Curable Gel UV Ink

The procedure from Example 3 is repeated with the same amounts of ink components, to which 0.57 g of an amide gellant which is the same as the one disclosed in Ink Example A of U.S. Pat. No. 7,714,040, the disclosure of which is totally incorporated herein by reference, is added at the moment when the initiators are added to the ink composition. This provides 10.75 g of a curable gel UV ink containing about 12% carbon coated iron nanoparticles.

Example 7

General Procedure for Fabrication of a Curable Gel UV Ink

The procedure described in Example 5 is repeated by adding an amide gellant in a proportion of 5-10% to the ink, as shown in Table 2.

TABLE 2

(ink with gellant)

| Component | Weight % |
|---|---|
| Amide gellant | 5-10% |
| UNILIN 350 wax acrylate | 3-7% |
| SR399LV monomer | 3-7% |
| IRGACURE 379 | 1-5% |
| IRGACURE 819 | 1-5% |
| IRGACURE 127 | 1-5% |
| IRGASTAB UV10 | 0-3% |
| 15 wt % magnetic particle dispersion/SR9003 | 60-80% |
| Total | 100 |

Example 8

Prophetic

Curable Magnetic Ink Containing Polymer Coated Magnetic Nanoparticles

Polystyrene coated cobalt, nanoparticles are obtained by thermal decomposition of dicobalt octacarbonyl in dichlorobenzene as a solvent in the presence of a polystyrene polymer terminated with a phosphine oxide group, and an amine terminated polystyrene in a ratio of 4:1 (w/w) at 160 deg. C. under argon for 30 min. The reaction mixture is precipitated into hexane and further washed to provide polystyrene coated cobalt nanoparticles. The fabrication process is described in US2010/0015472 A1 (Bradshaw).

The procedure for fabrication of ink both concentrate (Example 1) and ink (Example 3) are repeated by replacing the carbon-coated iron nanoparticles with polystyrene coated cobalt nanoparticles top provide an ink containing polymer coated cobalt nanoparticles.

Example 9

Curable Magnetic Ink with Surfactant Coated Magnetic Nanoparticles

Surfactant coated FeCo alloy magnetic nanoparticles of an average size of about 10 nm (as determined by TEM) are obtained by reductive decomposition of Fe(III) acetylacetonate and Co(II) acetylacetonate in a mixture of surfactants (oleic acid and trioctyl phosphine) in 1,2-hexadecanediol under a gas mixture of 93% Ar+7% H2 at 300° C., The experimental procedure is fully described in J. Am. Chem. Soc. 120: 7214-5 (2007). The procedure for fabrication of ink both concentrate (Example 1) and ink (Example 3) are repeated by replacing the carbon-coated iron nanoparticles with FeCo nanoparticles coated with a mixture of surfactants as described above.

Magnetic Ink Curing

Drops of ink composition from Example 3 were deposited on paper with a pipette. The drops were cured by passing the ink coated paper under a 600 W Fusion UV Systems, Inc. Lighthammer lamp fitted with a mercury D-bulb at a belt speed of 32 feet per minute. A skin is visible on the surface of the droplets indicating that curing has taken place Summary In summary, the present embodiments provide a magnetic UV curable ink compositions made by using coated magnetic nanoparticles dispersed in an UV curable ink base with optional colorants. The coating material may include carbon materials, polymeric materials, inorganic oxides, surfactants and mixtures thereof. The inks are suitable for MICR and security applications. Moreover, the use of stabilized magnetic nanoparticles allows for safe and scalable magnetic UV curable ink fabrication by using processes generally suitable for pigmented inks as the protected particles are a reduced fire hazard when compared with bare particles). In addition, UV curable ink bases both with and without phase change gellants are suitable for the various applications.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

All the patents and applications referred to herein are hereby specifically, and totally incorporated herein by reference in their entirety in the instant specification

What is claimed is:

1. An ink comprising:
    a curable ink carrier comprising
        a monomer,
        a photoinitiator,
        an optional curable oligomer, and
        one or more optional additives;
    coated magnetic nanoparticles, wherein the coated magnetic nanoparticles are comprised of a magnetic metal core and a protective coating disposed on the magnetic metal core, wherein the protective coating is selected from the group consisting of carbon materials, polymeric materials, surfactants and mixtures thereof, and has a thickness of from about 0.2 nm to about 100 nm; and
    an optional colorant.

2. The ink according to claim 1, wherein the magnetic metal core is selected from the group consisting of Fe, Mn, Co, Ni, FePt, CoPt, MnAl and MnBi and mixtures thereof.

3. The ink according to claim 1, wherein the carbon materials are selected from the group consisting of amorphous carbon, glassy carbon, graphite, and mixtures thereof.

4. The ink according to claim 1, wherein the polymeric materials are selected from the group consisting of amorphous homopolymers and copolymers, crystalline homopolymers and copolymers, polymers and oligomers with a Mw of from about 500 Daltons to about 5000 Daltons, polymers with a Mw of from about 5000 Daltons to about 1,000,000 Daltons and mixtures thereof.

5. The ink according to claim 1, wherein the surfactants are selected from the group consisting of anionic surfactants, cationic surfactants, non-ionic surfactants, zwitterionic surfactants, and mixtures thereof.

6. The ink according to claim 1, wherein the magnetic nanoparticles have a remanence of about 20 emu/gram to about 100 emu/gram.

7. The ink according to claim 1, wherein the magnetic nanoparticles have a coercivity of about 200 Oersteds to about 50,000 Oersteds.

8. The ink according to claim 1, wherein the magnetic nanoparticles have a magnetic saturation moment of from about 20 emu/gram to about 150 emu/gram.

9. The ink according to claim 1, wherein a size of the nanoparticles in all dimensions is about 3 nm to about 300 nm.

10. The ink according to claim 1, wherein the magnetic metal core has a shape selected from the group consisting of needle-shaped, granular, globular, cube, hexagonal, oval and spherical and amorphous.

11. The ink according to claim 1, wherein the magnetic metal core has a needle-like shape with an aspect ratio of from about 3:2 to about 10:1.

12. The ink according to claim 1, wherein the carrier is present in an amount of about 0.1 to about 99 weight percent and the colorant is present in an amount of about 0.1 to about 50 weight percent of the ink.

13. The ink according to claim 1 wherein the monomer is selected from the group consisting of acrylated esters, acrylated polyesters, acrylated ethers, acrylated polyethers, acrylated epoxies, urethane acrylates, pentaerythritol tetraacrylate, and mixtures thereof.

14. The ink according to claim 1, wherein the initiator is selected from a group consisting of benzyl ketones, monomeric hydroxyl ketones, polymeric hydroxyl ketones, α-amino ketones, acyl phosphine oxides, metallocenes, benzophenone, benzophenone derivatives, and mixtures thereof.

15. The ink according to claim 1, wherein the one or more additives are selected from the group consisting of a wax, a dispersant, a synergist, a stabilizer, a viscosity modifier, a clarifier, and mixtures thereof.

16. An ink comprising:
    a curable ink carrier comprising
        a monomer,
        a photoinitiator,
        an optional curable oligomer, and
        one or more optional additives;
    coated magnetic nanoparticles, wherein the coated magnetic nanoparticles are comprised of a magnetic metal core and a protective coating disposed on the magnetic metal core, wherein the protective coating is selected from the group consisting of carbon materials, polymeric materials, surfactants and mixtures thereof, and has a thickness of from about 0.2 nm to about 100 nm; a gellant; and
an optional colorant.

17. The ink according to claim 16, wherein the gellant is selected from a group consisting of:

(a) a polyamide with the general structure:

wherein n is an integer between 1 and 5; $R_1$ is (i) an alkylene group, (ii) an arylene group, (iii) an arylalkylene group (iv) an alkylarylene group;

$R_2$ and $R_2'$ each, independently of the other, are (i) alkylene groups (ii) arylene groups, (iii) arylalkylene groups (iv) alkylarylene groups; and $R_3$ and $R_3'$ each, independently of the other, are either (A) photoinitiating groups, or (B) groups which are (i) alkyl groups, (ii) aryl groups (iii) arylalkyl groups (iv) alkylaryl groups, and X and X' each, independently of the other, is an oxygen atom or a group of the formula $NR_4$, wherein $R_4$ is (i) a hydrogen atom, (ii) an alkyl group, (iii) an aryl group, (iv) an arylalkyl group, or (v) an alkylaryl group;

(b) a curable amide gellant;
(c) an ester-terminated diamide compound; and
(d) a trans-1,2-cyclohexane-bis(urea-urethane) compound.

18. An ink comprising:
a curable ink carrier comprising
  a monomer,
  a photoinitiator,
  an optional curable oligomer, and
  one or more optional additives;
coated magnetic nanoparticles, wherein the coated magnetic nanoparticles are comprised of a magnetic metal core and a protective coating disposed on the magnetic metal core, wherein the protective coating is selected from the group consisting of carbon materials, polymeric materials, surfactants and mixtures thereof, and has a thickness of from about 0.2 nm to about 100 nm; and
an optional colorant, wherein the ink is used for Magnetic Ink Character Recognition applications.

19. The ink of claim 1, wherein the protective coating is carbon materials.

20. The ink of claim 1, wherein the protective coating comprises carbon materials and surfactants.

* * * * *